(12) United States Patent
Wang et al.

(10) Patent No.: US 8,373,654 B2
(45) Date of Patent: Feb. 12, 2013

(54) IMAGE BASED MOTION GESTURE RECOGNITION METHOD AND SYSTEM THEREOF

(75) Inventors: Jing-Wei Wang, Los Angeles, CA (US); Chung-Cheng Lou, Taipei (TW)

(73) Assignee: Acer Incorporated, Taipei County (TW)

( * ) Notice: Subject to any disclaimer, the term of this patent is extended or adjusted under 35 U.S.C. 154(b) by 331 days.

(21) Appl. No.: 12/770,698

(22) Filed: Apr. 29, 2010

(65) Prior Publication Data

US 2011/0267258 A1 Nov. 3, 2011

(51) Int. Cl.
*G09G 5/00* (2006.01)
(52) U.S. Cl. ......................................... 345/156; 382/103
(58) Field of Classification Search .................. 345/156; 382/103
See application file for complete search history.

(56) References Cited

U.S. PATENT DOCUMENTS

| | | | | |
|---|---|---|---|---|
| 6,002,808 A | * | 12/1999 | Freeman | 382/288 |
| 7,129,927 B2 | * | 10/2006 | Mattsson | 345/158 |
| 2008/0181459 A1 | * | 7/2008 | Martin et al. | 382/103 |
| 2009/0103780 A1 | * | 4/2009 | Nishihara et al. | 382/103 |
| 2009/0174652 A1 | * | 7/2009 | Yamamoto et al. | 345/156 |
| 2009/0217211 A1 | * | 8/2009 | Hildreth et al. | 715/863 |
| 2011/0026765 A1 | * | 2/2011 | Ivanich et al. | 382/103 |
| 2011/0289456 A1 | * | 11/2011 | Reville et al. | 715/830 |
| 2011/0291926 A1 | * | 12/2011 | Gokturk et al. | 345/158 |

* cited by examiner

*Primary Examiner* — Viet Pham
(74) *Attorney, Agent, or Firm* — Thomas |Kayden

(57) ABSTRACT

An image based motion gesture recognition method and system thereof are disclosed. In embodiment, a hand posture detection is performed according to the received image frames, to obtain a first hand posture. It is then determined whether the first hand posture matches a predefined starting posture or not. If the first hand posture matches said predefined starting posture, movement tracking is performed according to hand locations on image frames, to obtain a motion gesture. During said movement tracking, the hand posture detection is performed according to said image frames to obtain a second hand posture, and it is determined whether the second hand posture matches a predefined ending posture. If the second hand posture matches the predefined ending posture, the movement tracking is stopped. Therefore, reduce complexity motion gesture recognition can be reduced and the reliability in interaction can be improved.

10 Claims, 9 Drawing Sheets

IMAGE BASED MOTION GESTURE RECOGNITION METHOD AND SYSTEM THEREOF

TECHNICAL FIELD

The present invention relates generally to hand detection system, more particularly, related to image based motion gesture recognition system capable of detecting a motion of user's hand arranged no sensor and recognizing a starting posture and an ending posture for improved tracking.

BACKGROUND

Friendly interaction between human and computer is critical for the development of entertainment systems, especially for gaming systems. The rapid development of the motion analyses systems and computer-controlled devices has introduced possibility of new ways of interacting with computers. However, many existing solutions make use of sensor devices which often needed to be attached on the user fingers. Although this way can offer accurate hand detection, it also increases users' burden. One preferred method is to use hand as a commanding device, i.e. using movements to enter commands into the operating system of the computer or control peripheral devices. However, the known methods and systems are rather complex and not robust enough.

According to U.S. Pat. No. 6,002,808, a system is provided for rapidly recognizing hand gestures for the control of computer graphics, in which image moment calculations are utilized to determine an overall equivalent rectangle corresponding to hand position, orientation and size, with size in one embodiment correlating to the width of the hand. In a further embodiment, a hole generated through the utilization of the touching of the forefinger with the thumb provides a special trigger gesture recognized through the corresponding hole in the binary representation of the hand. In a further embodiment, image moments of images of other objects are detected for controlling or directing onscreen images.

According to U.S. Pat. No. 7,129,927, a gesture recognition system including elements for detecting and generating a signal corresponding to a number of markers arranged on an object, elements for processing the signal from the detecting elements, members for detecting position of the markers in the signal. The markers are divided into first and second set of markers, the first set of markers constituting a reference position and the system comprises elements for detecting movement of the second set of markers and generating a signal as a valid movement with respect to the reference position.

There thus is a need for an interaction system that offers an unconstrained or natural way for users to interact with computer, which means users can control without any other devices but their own hands.

SUMMARY OF THE INVENTION

Therefore, an object of the present invention is to provide an image based motion gesture recognition method and system thereof, so as to reduce complexity motion gesture recognition and improve reliability in interaction.

The object of the present invention can be achieved by providing an image based motion gesture recognition method, and the method comprises the following step. First, image frames are received. Hand posture detection is performed according to the received image frames, to obtain a first hand posture. It is then determined whether the first hand posture matches a predefined starting posture or not. If the first hand posture matches said predefined starting posture, movement tracking is performed according to hand locations on image frames, to obtain a motion gesture. During said movement tracking, the hand posture detection is performed according to said image frames to obtain a second hand posture, and it is determined whether the second hand posture matches a predefined ending posture. If the second hand posture matches the predefined ending posture, the movement tracking is stopped.

Preferably, if the second hand posture does not match the predefined ending posture, the movement tracking is continued.

Preferably, the step of performing the hand posture detection further comprises following steps. It is detected whether a hand image exists in at least one of the image frames. If the hand image exists in at least one of the image frames, a contoured hand image is obtained according to the hand image. A hand direction and a finger number are determined according to the contoured hand image. The first hand posture or the second hand posture is recognized according to the hand direction and the finger number.

Preferably, the step of performing the movement tracking further comprises steps of obtaining image blocks containing the hand image in each of the image frames, and estimating motion vectors of the image blocks in the image frames.

Preferably, the image based motion gesture recognition method in accordance with present invention further comprises steps of recording the motion vector to obtain a trace, and recognizing the trace to obtain the motion gesture.

Preferably, the step of determining the hand direction further comprises a step of determining the hand direction according to a edge of the image frame with which the contoured hand image contacts.

Preferably, the step of determining the finger number further comprises steps of performing a palm orientation calculation to obtain a gravity center of the contoured hand image; performing a palm cut on the contoured hand image according to the gravity center, to obtain a cut hand image; and determining the finger number according to the cut hand image.

The object of the present invention can be achieved by providing an image based motion gesture recognition system which comprises a storage unit, an image capture unit, a first processing unit, a comparing unit, a second processing unit. The storage unit stores a predefined starting posture and a predefined ending posture. The image capture unit is operable to capture image frames. The first processing unit performs a hand posture detection according to the image frames to obtain a first hand posture, and the comparing unit determines whether the first hand posture matches the predefined starting posture. If the first hand posture matches the predefined starting posture, the second processing unit performs a movement tracking according to hand locations on the image frames to obtain a motion gesture. During the movement tracking, the first processing unit performs the hand posture detection according to the image frames to obtain a second hand posture. The second processing unit stops the movement tracking if the comparing unit determines that the second hand posture matches a predefined ending posture.

Preferably, second processing unit continues the movement tracking if the comparing unit determines that the second hand posture does not match the predefined ending posture.

Preferably, the first processing unit further comprises a first image processing unit, a second image processing unit and a hand posture recognition unit. The first image processing unit is capable of detecting a hand image existing in at least one of the image frames. The second image processing unit is capable of obtaining a contoured hand image according to the hand image. The hand posture recognition unit is capable of determining a hand direction and a finger number according to the contoured hand image, and recognizing the first hand posture or the second hand posture according to the hand direction and the finger number.

Preferably, the second processing unit further comprises a block detection unit and a motion vector unit. The block detection unit is capable of obtaining image blocks containing the hand image in each of the image frames. The motion vector unit is capable of estimating motion vectors of image blocks in the image frames.

Preferably, the second processing unit further comprises a trace recognition unit capable of recording the motion vector to obtain a trace, and recognizing the trace to obtain the motion gesture.

Preferably, the hand posture recognition unit determines the hand direction according to an edge of the image frame with which the contoured hand image contacts.

Preferably, the hand posture recognition unit further performs a palm orientation calculation to obtain a gravity center of the contoured hand image, and performs a palm cut on the contoured hand image according to the gravity center, to obtain a cut hand image, and determines the finger number according to said cut hand image.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
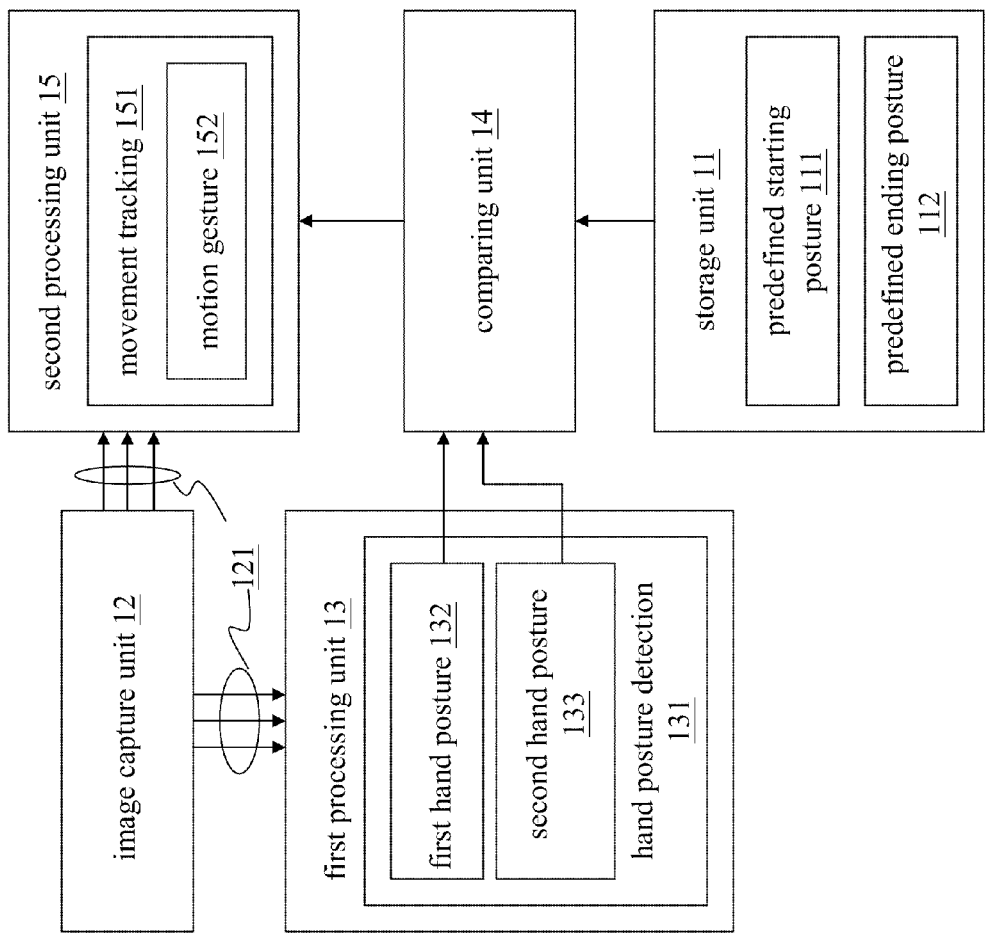
FIG. 1 illustrates a block diagram of an image based motion gesture recognition system in accordance with the present invention.

FIG. 1 illustrates a block diagram of an image based motion gesture recognition system in accordance with the present invention. The system comprises a storage unit 11, an image capture unit 12, a first processing unit 13, a comparing unit 14 and a second processing unit 15. The storage unit 11 stores a predefined starting posture 111 and a predefined ending posture 112. The image capture unit 12 is operable to capture image frames 121. Preferably, the image capture unit 12 can be a camera or a webcam capable of outputting sequential image frames. The first processing unit 13 is operable to perform a hand posture detection 131 according to the image frames 121 to obtain a first hand posture 132, and the comparing unit 14 is operable to determine whether the first hand posture 132 matches the predefined starting posture 111.

If the comparing unit 14 determined that the first hand posture 132 matches the predefined starting posture 111, the second processing unit 15 performs a movement tracking 151 according to hand locations on the image frames 121 to obtain a motion gesture 152. During movement tracking 151, the first processing unit 13 performs the hand posture detection 131 according to the image frames 121 to obtain a second hand posture 133. The second processing unit 15 stops the movement tracking 151 if the comparing unit 14 determines that the second hand posture 133 matches the predefined ending posture 112; otherwise, the second processing unit 15 keeps performing the movement tracking 151 if the comparing unit 14 determines that the second hand posture 133 does not match the predefined ending posture 112.

Therefore, the system can notify user pattern of the predefined starting posture 111 and the predefined ending posture 112. Therefore, the user can hold the predefined starting posture 111 for informing input of command or data. After success of posture recognition, user can change or move his/her gesture for further operation. During operation, the system still continues posture recognition for determining the command desired to input, in the other hand, the system also determines whether the recognized posture matches the predefined ending posture 112 for further stop operation. Preferably, the predefined starting posture 111 or the predefined ending posture 112 is the particular and definitely posture, so that the recognition mistake happening during gesture change in user operation can be prevented efficiently. Besides, the motion gesture recognition is clearly defined by starting posture and ending posture, and it causes the complexity of recognition to be simpler and hand operation to be smoother. Therefore the possibility of real-time implementation for motion gesture recognition system can be increased.

Figure 2:
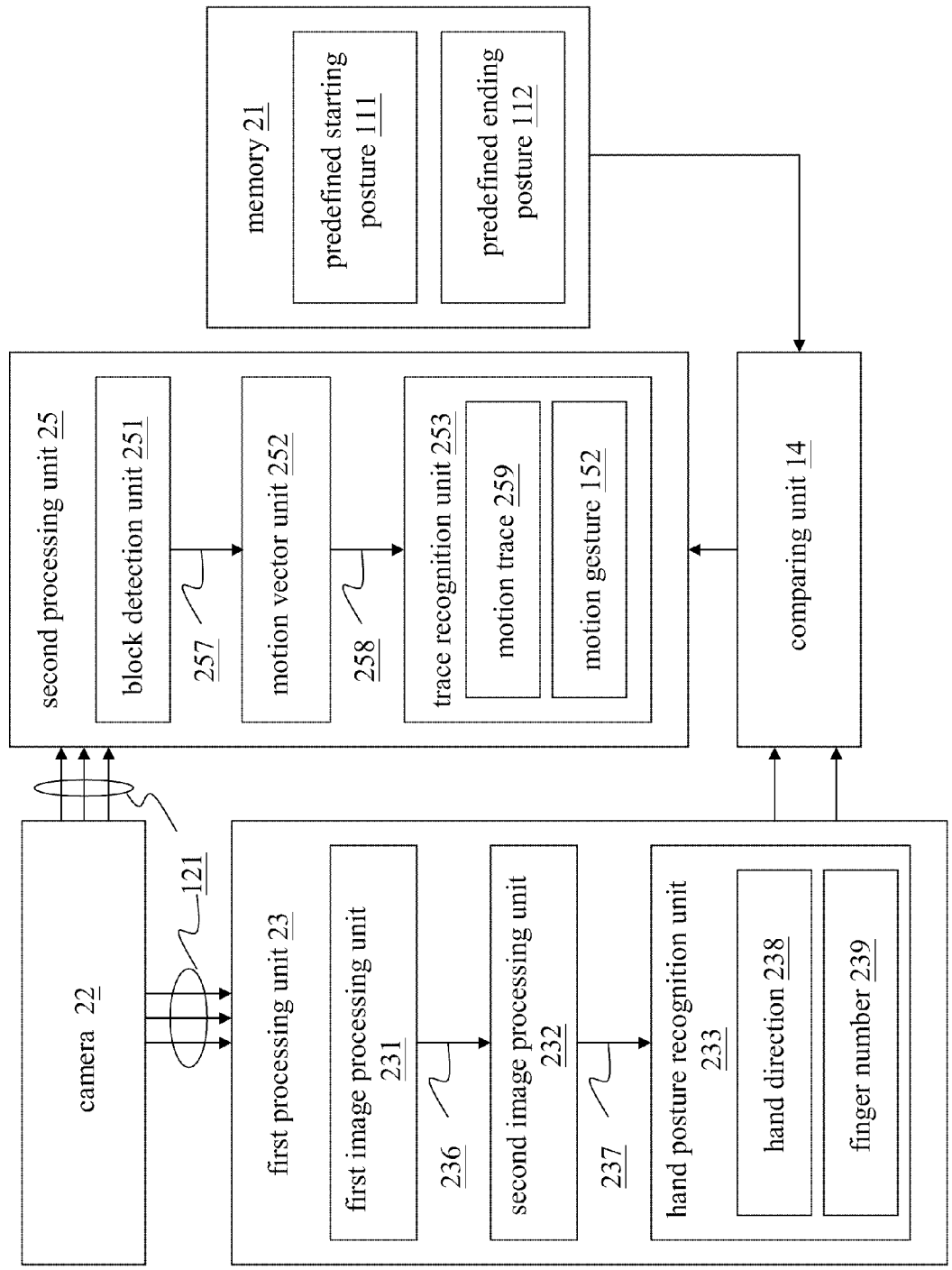
FIG. 2 illustrates a block diagram of embodiment of image based motion gesture recognition system in accordance with the present invention.

FIG. 2 illustrates a block diagram of embodiment of image based motion gesture recognition system in accordance with the present invention. The system comprises a memory 21, a camera 22, a first processing unit 23, a comparing unit 14 and a second processing unit 25. The first processing unit 23 further comprises a first image processing unit 231, a second image processing unit 232 and a hand posture recognition unit 233. The first image processing unit 231 is operable to detect a hand image 236 existing in at least one of the image frames 121, such as the hand image 31 shown in FIG. 3. According to the hand image 236, the second image processing unit 232 obtains a contoured hand image 237, such as the image area 33 shown in FIG. 3. Preferably, the second image processing unit 232 can perform an edge detection for the hand image 236, to extract a hand contour 32, so that the image area 33 surrounded by the hand contour 32 and the edge of the hand image 236 can be defined as the contoured hand image 237.

Figure 3:
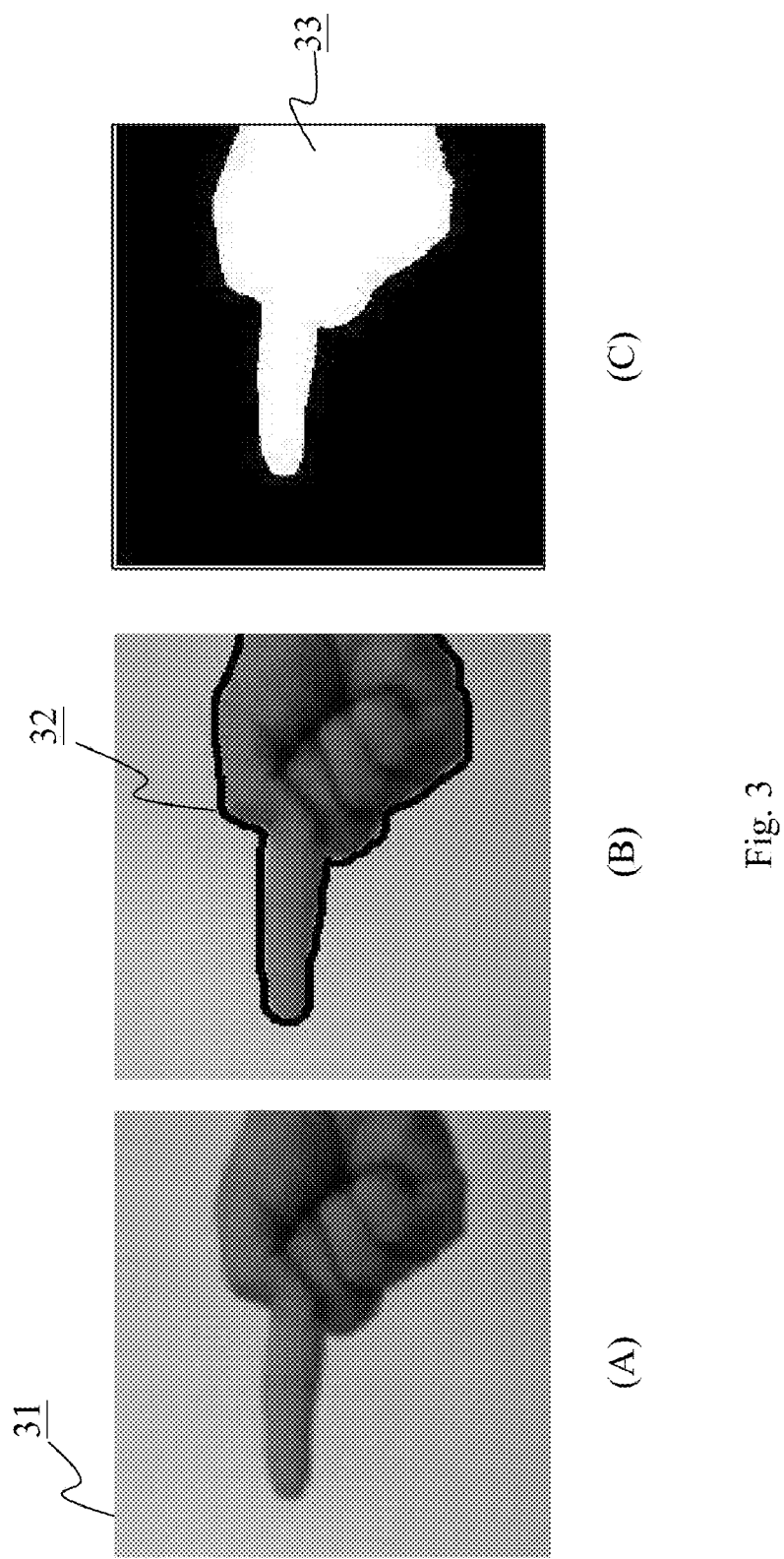
FIG. 3 illustrates a schematic view of an exemplary contoured hand image in accordance with the present invention.

The hand posture recognition unit 233 is operable to determine a hand direction 238 and finger number 239 according to the contoured hand image 237. Preferably, the edge of the image frame 121 with which the contoured hand image 237 contacts can be used to determine the hand direction 238. In FIG. 3, the image area 33 contacts with the right edge of the image frame 121, so the hand direction is defined as east; if the edge being contacted is the bottom edge of the image frame 121, the hand direction is defined as south; if the edge being contacted is the top edge of the image frame 121, the hand direction is defined as north; if the edge being contacted is the right edge of the image frame 121, so the hand direction is defined as west.

The hand posture recognition unit 233 can perform a palm orientation calculation to obtain a gravity center of the contoured hand image 237. For example, a moment function I(x, y) can be selected according a regular 2D sharp of hand. Then first-order and second-order moment $M_{00}$, $M_{10}$, $M_{01}$, $M_{11}$, $M_{20}$ 及 $M_{02}$ are calculated according to the selected moment function. The followings are the exemplary function.

$$M_{00} = \sum_x \sum_y I(x, y)$$

$$M_{10} = \sum_x \sum_y x I(x, y)$$

$$M_{01} = \sum_x \sum_y y I(x, y)$$

$$M_{11} = \sum_x \sum_y xy I(x, y)$$

$$M_{20} = \sum_x \sum_y x^2 I(x, y)$$

$$M_{02} = \sum_x \sum_y y^2 I(x, y)$$

Figure 4:
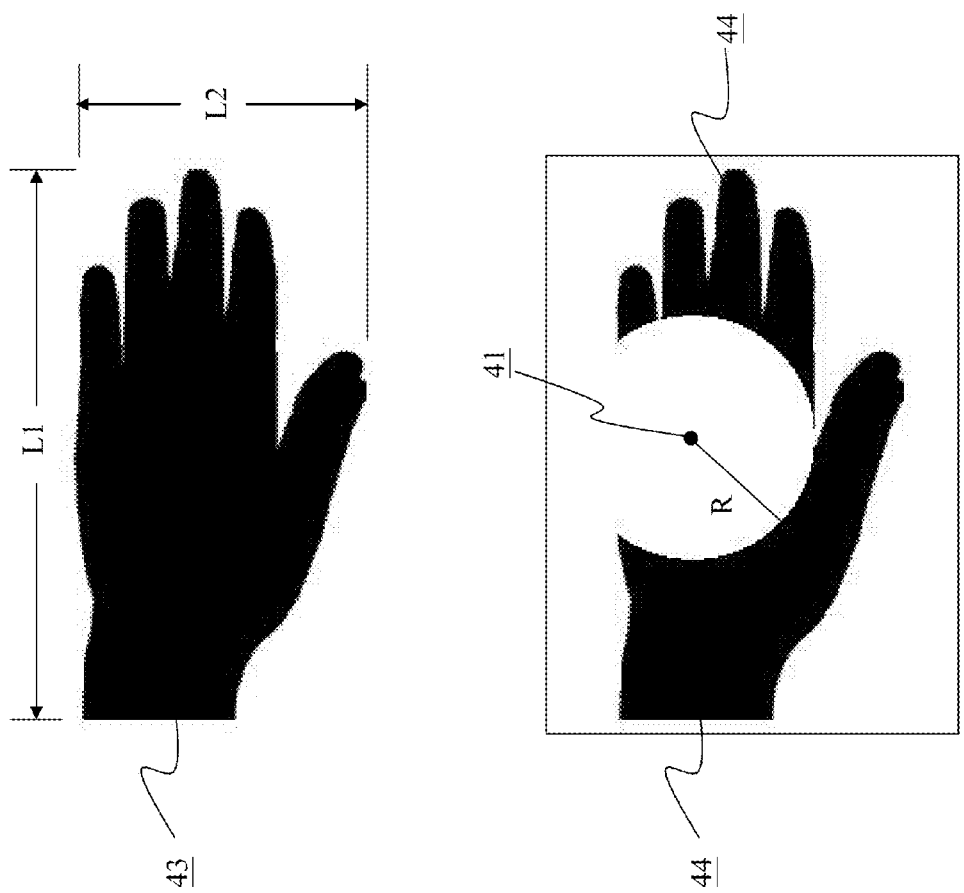
FIG. 4 illustrates a schematic view of an exemplary palm cut in accordance with the present invention.

The moment $M_{00}$, $M_{10}$ 及 $M_{01}$ are calculated according to the following functions, in order to obtain the gravity center. FIG. 4 also shows an exemplary location of gravity center 41.

$$x_c = \frac{M_{10}}{M_{00}}, y_c = \frac{M_{01}}{M_{00}}.$$

The length $L_1$ and width $L_2$ of equivalent rectangular for hand can be obtained by calculating $x_c$, $y_c$, $M_{00}$, $M_{11}$, $M_{20}$ and $M_{02}$ according to the following functions.

$$a = \frac{M_{20}}{M_{00}} - x_c^2, b = 2\left(\frac{M_{11}}{M_{00}} - x_c y_c\right), c = \frac{M_{02}}{M_{00}} - y_c^2$$

$$L_1 = \sqrt{6\left(a + c + \sqrt{b^2 + (a - c)^2}\right)}$$

$$L_2 = \sqrt{6\left(a + c - \sqrt{b^2 + (a - c)^2}\right)}$$

The palm cut is then performed according to the gravity center, as shown in FIG. 4, the contoured hand image 43 is cut by a circle area of which circle center is the gravity center 41 and radius is half of the width $L_2$ of the equivalent rectangular for hand, and the rest area is defined as a cut hand image 44. The cut hand image 44 can be used to determine the figure number 239 and a palm orientation. For example, if the area size of the cut hand image 44 is smaller than a predefined value, it indicates that user clenches his/her palm and the palm orientation is sphere; if the width of distributed range of the cut hand image 44 is larger than the height, it indicates that user's orientation is horizontal; if the width of distributed range of the cut hand image 44 is smaller than the height, it indicates that user's orientation is vertical.

Figure 5:
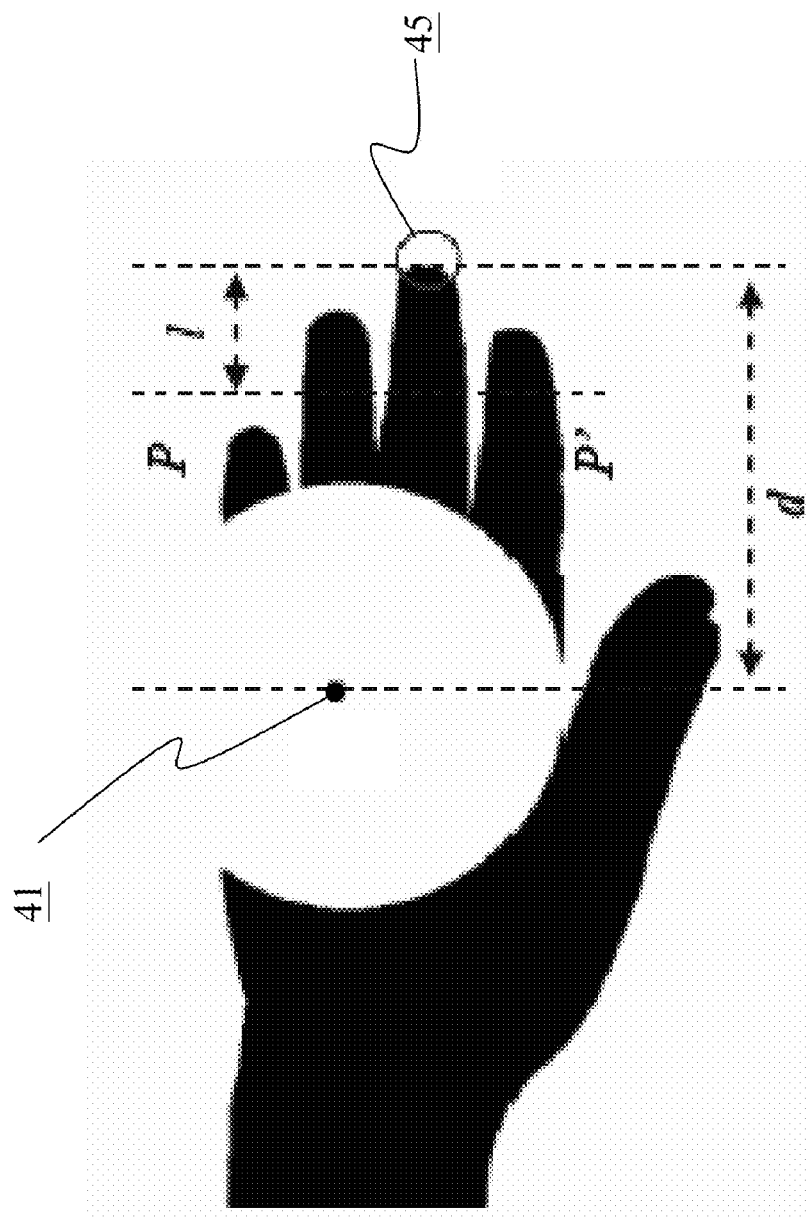
FIG. 5 illustrates a schematic view of an exemplary finger number determination in accordance with the present invention.

FIG. 5 illustrates a schematic view of an exemplary finger number determination in accordance with the present invention. A tip 45 being most distant from the edge of image frame is determined from the cut hand image 44. The distance d between the tip 45 and the gravity center 41 is calculated, which is then used to determined an l value, such as one third of d. Finally, the figure number 239 is determined by counting the overlapping times between the cut hand image 44 and a line PP', and the distance between line PP' and the tip 45 is l value.

Figure 6:
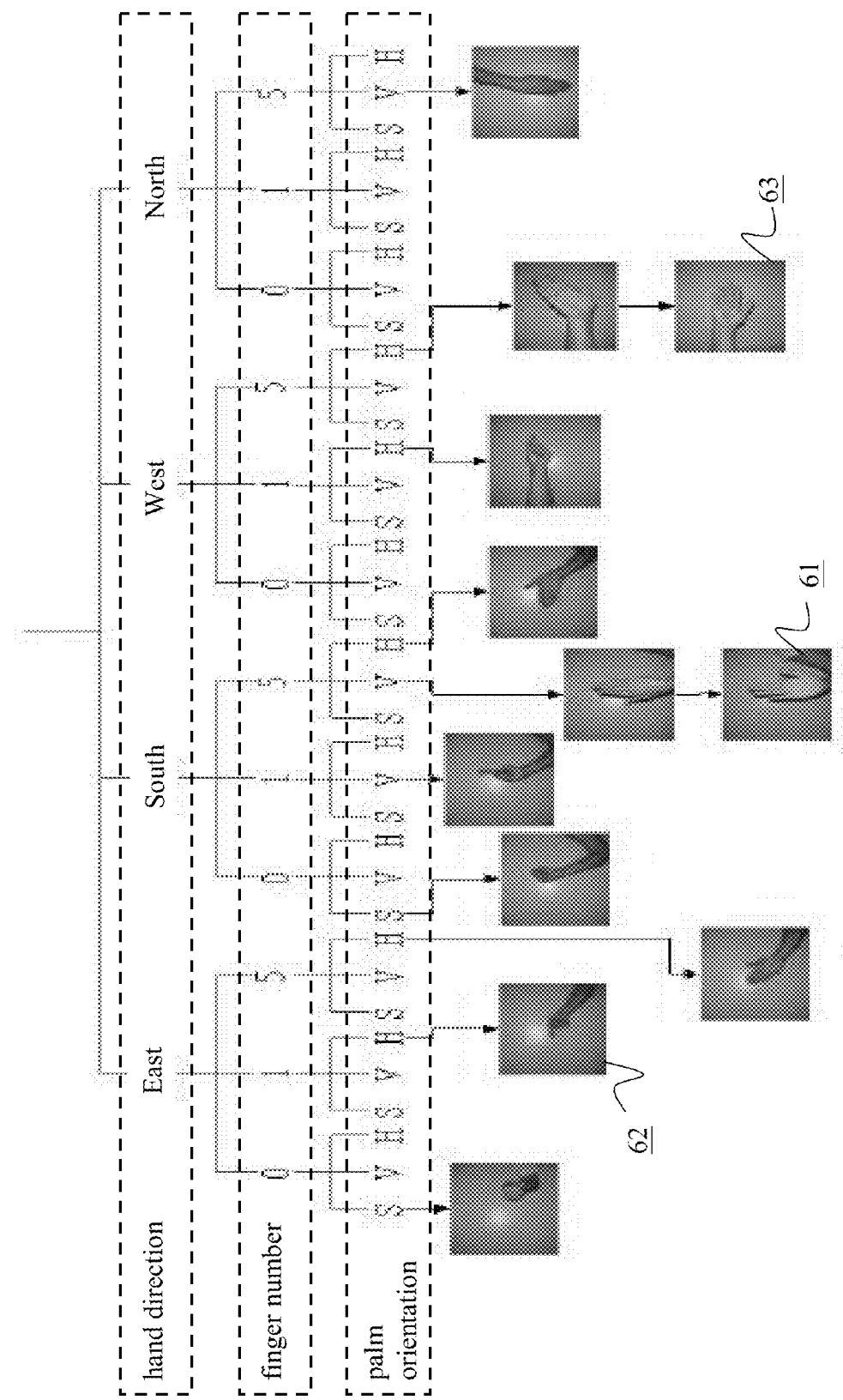
FIG. 6 illustrates a schematic view of an exemplary database for gesture recognition in accordance with the present invention.

The hand posture recognition unit 233 then recognizes the first hand posture 131 or the second hand posture 132 according to the hand direction 238 and the finger number 239. Preferably, the hand posture recognition unit 233 can search a data base for recognition. FIG. 6 illustrates a schematic view of an exemplary database for gesture recognition in accordance with the present invention. The exemplary database records comparison data comprising at least one first posture of which finger number is zero, at least one pointing posture of which finger number is one, and at least one open palm posture of which finger number is five. These comparison data are respectively grouped into four hand directions including east, west, south and north, and grouped into three palm orientations including horizontal orientation (H), vertical orientation (V) and spheral orientation (S). The hand posture recognition unit 233 can determine a corresponding posture by performing a search in the database at least according to hand direction 238 and figure number 239. For example, if the hand direction 238 is south, figure number 239 is 5 and the palm orientation is vertical, the hand posture recognition unit 233 can acquire a posture 61 which can be defined as a stop posture; if the hand direction 238 is east, figure number 239 is 1 and the palm orientation is horizontal, the hand posture recognition unit 233 can acquire a posture 62 which can be defined as a left pointing posture; if the hand direction 238 is west, figure number is 5 and the palm orientation is horizontal, the hand posture recognition unit 233 can acquire a posture 63 from the database.

The second processing unit 25 further comprises a block detection unit 251, a motion vector unit 252 and a trace recognition unit 253. The block detection unit 251 is operable to obtain image blocks 257 containing the hand image 236 in each of the image frames 121. The motion vector unit 252 is operable to estimate motion vectors 258 of image blocks 257 in the image frames 121. The motion vector estimation is a well known technology, so we do not explain it in detail. The trace recognition unit 253 is operable to record multiple motion vectors 258 to obtain a motion trace 259, and recognize the motion trace 259 to obtain a moving posture 152.

Figure 7:
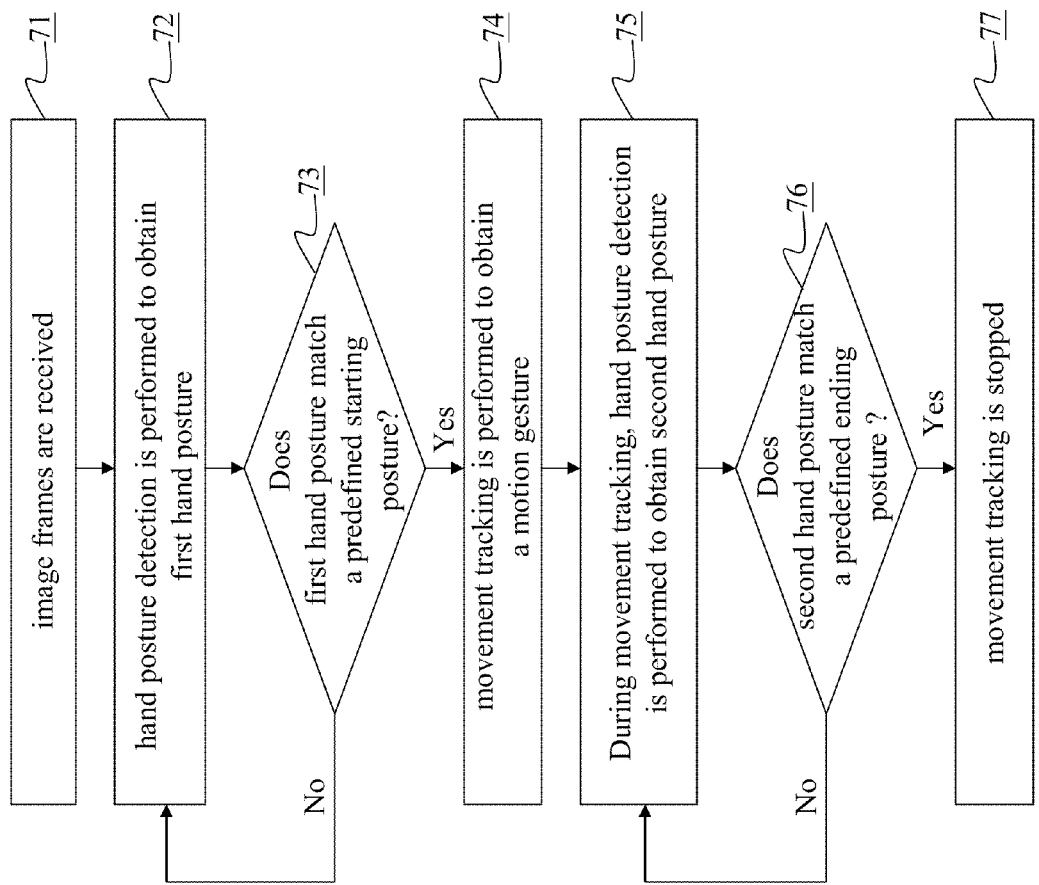
FIG. 7 illustrates a flow chart of an image based motion gesture recognition method in accordance with the present invention.

FIG. 7 illustrates a flow chart of an image based motion gesture recognition method in accordance with the present invention. In step 71, image frames are received. In step 72, hand posture detection is performed according to the received image frames, to obtain a first hand posture. In step 73, it is then determined whether the first hand posture matches a predefined starting posture or not. If the first hand posture matches said predefined starting posture, in step 74 movement tracking is performed according to hand locations on image frames, to obtain a motion gesture; otherwise, step 72 is performed. During said movement tracking, the hand posture detection is performed according to said image frames to obtain a second hand posture in step 75. In step 76 it is determined whether the second hand posture matches a predefined ending posture. If the second hand posture matches the predefined ending posture, the movement tracking is stopped in step 77; otherwise, step 75 is performed. Therefore, complexity of the moving hand posture track and recognition can be reduced, and the recognition accuracy can ne improved.

Figure 8:
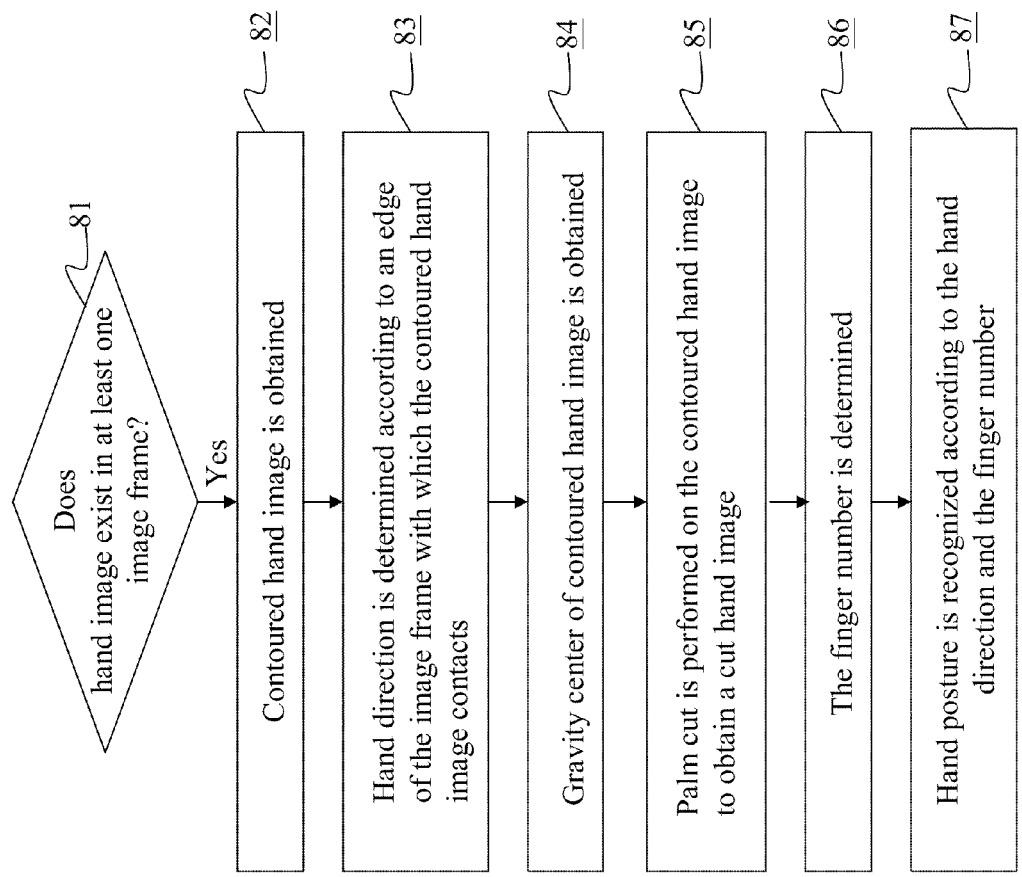
FIG. 8 illustrates a flow chart of a hand posture detection in accordance with the present invention.

FIG. 8 illustrates a flow chart of a hand posture detection in accordance with the present invention. In step 81, it is detected whether a hand image exists in at least one of the image frames. If the hand image exists in at least one of the image frames, in step 82, a contoured hand image is obtained according to the hand image, such as the image area 33 shown in FIG. 3. In step 83, the hand direction is determined according to an edge of the image frame with which the contoured hand image contacts. For example, the hand direction of the image area 33 is determined as east. In step 84 a palm orientation calculation is performed to obtain a gravity center of the contoured hand image, such as the gravity center 41 shown in FIG. 4. In step 85 a palm cut is performed on the contoured hand image according to the gravity center, to obtain a cut hand image. The finger number is then determined according to the cut hand image in step 86. A hand posture is recognized according to the hand direction and the finger number in step 87. Preferably, the palm orientation also can be used in the hand posture recognition.

Figure 9:
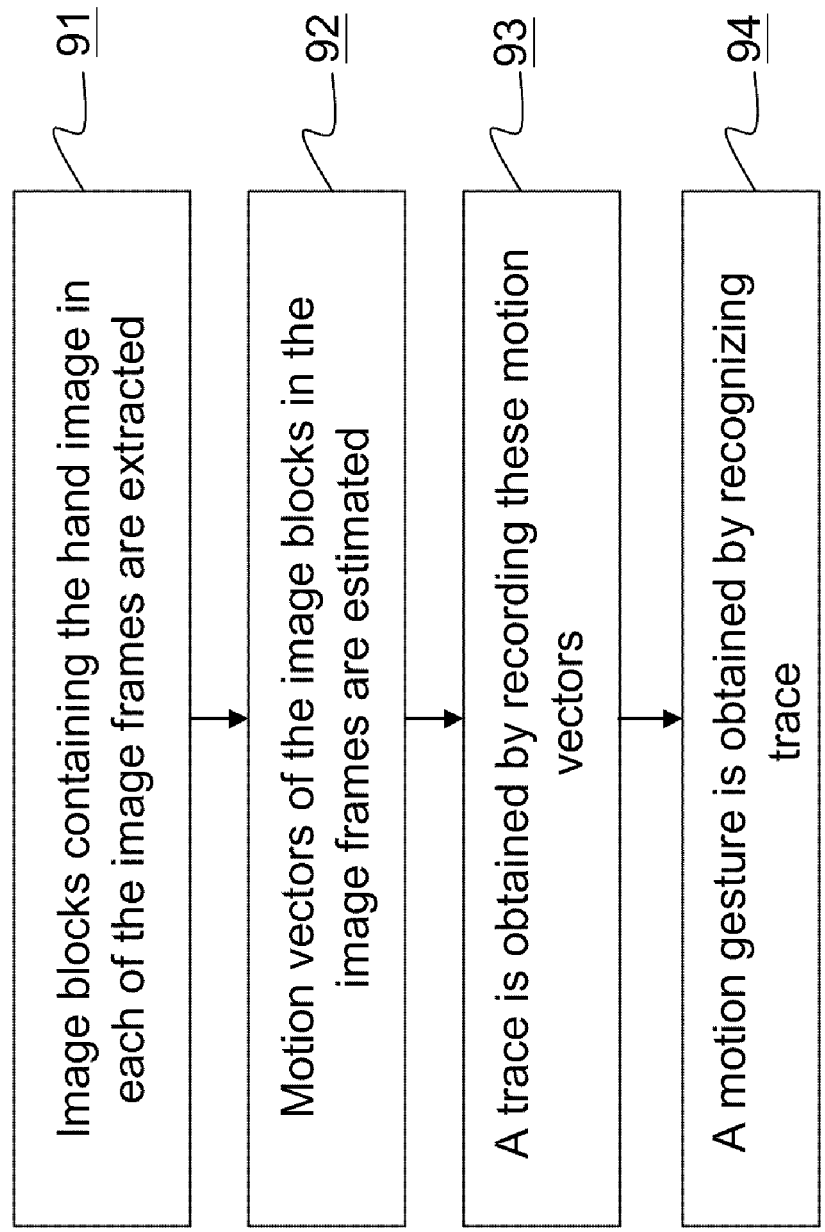
FIG. 9 illustrates a flow chart of a movement tracking in accordance with the present invention.

FIG. 9 illustrates a flow chart of a movement tracking in accordance with the present invention. In step 91, image blocks containing the hand image in each of the image frames are extracted. In step 92, motion vectors of the image blocks in the image frames are estimated. In step 93 a trace is obtained by recording these motion vectors. In step 94 a motion gesture is obtained by recognizing the trace.

The above detailed description is intended to illustrate the specific embodiments provided herein and not intended to limit the present invention. One skilled in the art will be able to provide numerous variations and modifications within the scope of the present invention upon consideration of the above detailed description and the accompanying drawings. The present invention is defined by the following claims.

What is claimed is:

1. An image based motion gesture recognition method, comprising steps of:
   receiving image frames;
   performing a hand posture detection according to said image frames, to obtain a first hand posture;
   determining whether said first hand posture matches a predefined starting posture;
   if said first hand posture matches said predefined starting posture, performing a movement tracking according to hand locations on said image frames, to obtain a motion gesture;
   performing said hand posture detection according to said image frames during said movement tracking, to obtain a second hand posture;
   determining whether said second hand posture matches a predefined ending posture; and
   if said second hand posture matches said predefined ending posture, stopping said movement tracking;
   wherein the step of performing said hand posture detection further comprises:
   detecting whether a hand image exists in at least one of said image frames;
   obtaining a contoured hand image according to said hand image if said hand image exists in at least one of said image frames;
   determining a hand direction and a finger number according to said contoured hand image, wherein the step of determining said finger number further comprises steps of:
   performing a palm orientation calculation to obtain a gravity center of said contoured hand image;
   performing a palm cut on said contoured hand image according to said gravity center, to obtain a cut hand image; and determining said finger number according to said cut hand image;
   recognizing said first hand posture or said second hand posture according to said hand direction and said finger number.

2. The image based motion gesture recognition method according to claim 1, further comprising a step of: continuing said movement tracking if said second hand posture does not match said predefined ending posture.

3. The image based motion gesture recognition method according to claim 1, wherein the step of performing said movement tracking further comprises: obtaining image blocks containing said hand image in each of said image frames; and estimating motion vectors of said image blocks in said image frames.

4. The image based motion gesture recognition method according to claim 3, further comprising steps of: recording said motion vector to obtain a trace; and recognizing said trace to obtain said motion gesture.

5. The image based motion gesture recognition method according to claim 1, wherein the step of determining said hand direction further comprises a step of: determining said hand direction according to an edge of said image frame with which said contoured hand image contacts.

6. An image based motion gesture recognition system, comprising:
   a storage unit storing a predefined starting posture and a predefined ending posture;
   an image capture unit capable of capturing image frames;
   a first processing unit capable of performing a hand posture detection according to said image frames, to obtain a first hand posture, wherein said first processing unit further comprises:
   a first image processing unit, capable of detecting a hand image existing in at least one of said image frames;
   a second image processing unit, capable of obtaining a contoured hand image according to said hand image; and
   a hand posture recognition unit, capable of determining a hand direction and a finger number according to said contoured hand image, and recognizing said first hand posture or said second hand posture according to said hand direction and said finger number, wherein said hand posture recognition unit further performs a palm orientation calculation to obtain a gravity center of said contoured hand image, and performs a palm cut on said contoured hand image according to said gravity center, to obtain a cut hand image, and determines said finger number according to said cut hand image;
   a comparing unit capable of determining whether said first hand posture matches said predefined starting posture; and
   a second processing unit capable of performing a movement tracking according to hand locations on said image frames to obtain a motion gesture, if said first hand posture matches said predefined starting posture;

wherein, said first processing unit performs said hand posture detection according to said image frames during said movement tracking, to obtain a second hand posture, and said second processing unit stops said movement tracking if said comparing unit determines that said second hand posture matches a predefined ending posture.

7. The image based motion gesture recognition system according to claim 6, wherein said second processing unit continues said movement tracking if said comparing unit determines that said second hand posture does not match said predefined ending posture.

8. The image based motion gesture recognition system according to claim 6, wherein said second processing unit further comprises: a block detection unit, capable of obtaining image blocks containing said hand image in each of said image frames; and a motion vector unit, capable of estimating motion vectors of image blocks in said image frames.

9. The image based motion gesture recognition system according to claim 8, wherein said second processing unit further comprises: a trace recognition unit, capable of recording said motion vector to obtain a trace, and recognizing said trace to obtain said motion gesture.

10. The image based motion gesture recognition system according to claim 6, wherein said hand posture recognition unit determines said hand direction according to an edge of said image frame with which said contoured hand image contacts.

* * * * *